United States Patent [19]

Radford

[11] Patent Number: 5,663,564

[45] Date of Patent: Sep. 2, 1997

[54] PHOTOVOLTAIC DETECTOR WITH INTEGRATED DARK CURRENT OFFSET CORRECTION

[75] Inventor: William A. Radford, Santa Barbara, Calif.

[73] Assignee: Santa Barbara Research Center, Goleta, Calif.

[21] Appl. No.: 618,699

[22] Filed: Mar. 20, 1996

[51] Int. Cl.$^6$ ........................................ G01J 5/30
[52] U.S. Cl. .................. 250/338.4; 250/349; 250/214 C
[58] Field of Search ............................ 250/338.4, 349, 250/214 C

[56] References Cited

U.S. PATENT DOCUMENTS 5,410,145  4/1995  Coroy ............................ 250/214 C

*Primary Examiner*—Carolyn E. Fields
*Attorney, Agent, or Firm*—W. C. Schubert; W. K. Denson-Low

[57] ABSTRACT

An integrated photovoltaic detector includes a reference photovoltaic detector and an active photovoltaic detector in a series connection. The reference detector produces a dark current that opposes the active detector's dark current. The active detector effectively masks the reference detector from incident illumination so that the active detector produces photocurrent but the reference detector does not. The band gap of the reference detector is preferably matched to the active detector so that their dark currents are substantially matched over a temperature range. As a result, the current read out of the integrated detector at the series connection is approximately equal to the photocurrent generated by the active detector. This improves the detector's SNR, signal resolution, and useful operating temperature range.

14 Claims, 2 Drawing Sheets

PHOTOVOLTAIC DETECTOR WITH INTEGRATED DARK CURRENT OFFSET CORRECTION

BACKGROUND OF THE INVENTION

1. Field of the Invention

This invention relates to photovoltaic detectors and more specifically to a photovoltaic detector with integrated dark current offset correction.

2. Description of the Related Art

Photodetector arrays which may include hundreds or thousands of photovoltaic detector cells are used to detect intensity patterns in the infrared, ultraviolet and visible spectra in applications such as weather satellites, earth remote sensing, and industrial processes. A photovoltaic detector cell includes a flat photovoltaic wafer made from n-type or p-type crystalline semiconductor material that absorbs photons over a desired spectrum. The wafer is formed on a substrate that is transparent to photons in the desired spectrum. A thin surface layer of the opposite conductivity type is formed on the wafer so that the interface between the surface layer and the main or bulk region of the wafer defines a semiconductor p-n junction. A potential is applied across the cell such that the cell operates in reverse bias mode.

Illumination of the transparent substrate with photons having wavelengths in the desired spectrum creates electron-hole pairs in the cell that diffuse to and are collected at the p-n junction. This mechanism generates a photocurrent that is proportional to the intensity of the incident photons. Thermal energy also generates electron-hole pairs in both the bulk and depletion regions that diffuse to and are collected at the p-n junction. This mechanism generates a dark or leakage current that is independent of the illumination intensity and which adds to the photocurrent. The dark current increases as the band gap energy of the cell is narrowed. For example, in infrared detectors the dark current may be 5 to 10 times greater than the photocurrent. The dark current is also highly sensitive to changes in temperature and increases exponentially as the temperature increases. In high temperature industrial applications the dark current may effectively swamp out the photocurrent. In general the dark current is insensitive to changes in the potential across the cell. However, at low enough temperatures the electron hold pairs in the depletion region tend to dominate such that the dark current does change with potential.

As a result, the photovoltaic detector cell generates a detection current having a signal component equal to the photocurrent and an offset equal to the dark current. In a typical IR focal plane array, a readout capacitor integrates the detector current for a preset integration period at which point the capacitor is discharged and reset. An A/D converter, suitably 14 bits, digitizes the voltage signal from the integration capacitor and passes it to a calibration circuit. The calibration circuit computes the offset and the slope of the cell's current v. photon intensity response curve and normalizes the output to a zero offset and reference slope so that each cell in the array has the same response. The fabrication of a HgCdTe infrared detector of the type described above is described in Reine et al. Semiconductors and Semimetals: *Volume 18 Mercury Cadmium Telluride*, Academic Press, Ch 6—Photovoltaic Infrared Detectors, pp. 246–256, 1981.

The dark current offset reduces the cell's sensitivity to changes in photon intensity, which reduces the resolution of the digitized voltage signal. First, the signal-to-noise ration (SNR) of the detector current is proportional to the square root of the integration period for charging the capacitor. The dark current reduces the integration period, and thus reduces the SNR. Second, approximately 6 bits of the A/D converter are used to digitize the offset. Those bits are effectively wasted, thus reducing the resolution of the signal component from 14 bits to 8 bits.

Due to the strong variation in dark current with temperature, many systems have strict requirements on the maximum spatial temperature variation across the focal plane array as well on the temperature stability itself. This is true even when the dark current is less than the photocurrent. To maintain the accuracy of the calibration circuitry, the spatial variation is often specified as less than 0.1K variation across the array, and the stability is specified as less than 0.1K change over 30 seconds. In addition, some systems have strict requirements on the time required to cooldown and stabilize the array to the point it can operate accurately. These requirements necessitate expensive packaging, cooling, and calibration techniques.

SUMMARY OF THE INVENTION

In view of the above problems, the present invention provides a photovoltaic detector with integrated dark current offset correction having improved SNR, signal resolution and temperature independence.

This is accomplished by integrating a reference photovoltaic detector with the active photovoltaic detector to produce a dark current that opposes the active detector's dark current. The active detector effectively masks the reference detector from incident illumination so that the active detector produces photocurrent but the reference detector does not. The band gap of the reference detector is preferably matched to the active detector so that their dark currents are substantially matched over a temperature range. As a result, the current read out of the integrated detector is approximately equal to only the photocurrent generated by the active detector. This increases the detector's SNR and signal resolution, and reduces its temperature dependence which allows less expensive packing and cooling techniques to be employed.

These and other features and advantages of the invention will be apparent to those skilled in the art from the following detailed description of preferred embodiments, taken together with the accompanying drawings, in which:

DETAILED DESCRIPTION OF THE INVENTION

In the present invention, a reference photovoltaic detector cell is integrated with the active photovoltaic detector cell to provide an opposing dark current that preferably reduces the offset to substantially zero. This actually adds a noise component that reduces the SNR by up to √2. However, if the dark current is more than twice the photocurrent the increase in the integration period will more than offset the added noise component so that the overall SNR will be improved. Furthermore, by eliminating the offset all of the A/D converter's bits are used to digitize the signal component of the detector current. In addition, by eliminating the detector's temperature dependence, less expensive packaging and cooling techniques can be employed. This is a significant benefit even when there is no improvement in sensitivity due to relatively low levels of dark current.

Although the invention is applicable to all photodetectors, it is particularly applicable to infrared detectors and high temperature detectors. Infrared detectors have relatively narrow band gap energies, 100–250 meV, so that the dark current is several times greater than the photocurrent. Furthermore, infrared sources typically have a very low contrast, approximately 1 to 2%. As a result, the detectors must have a very high SNR. In visible light detectors the photocurrent is typically much larger than the dark current. However, in high temperature industrial applications the dark current can become significant.

Figure 1:
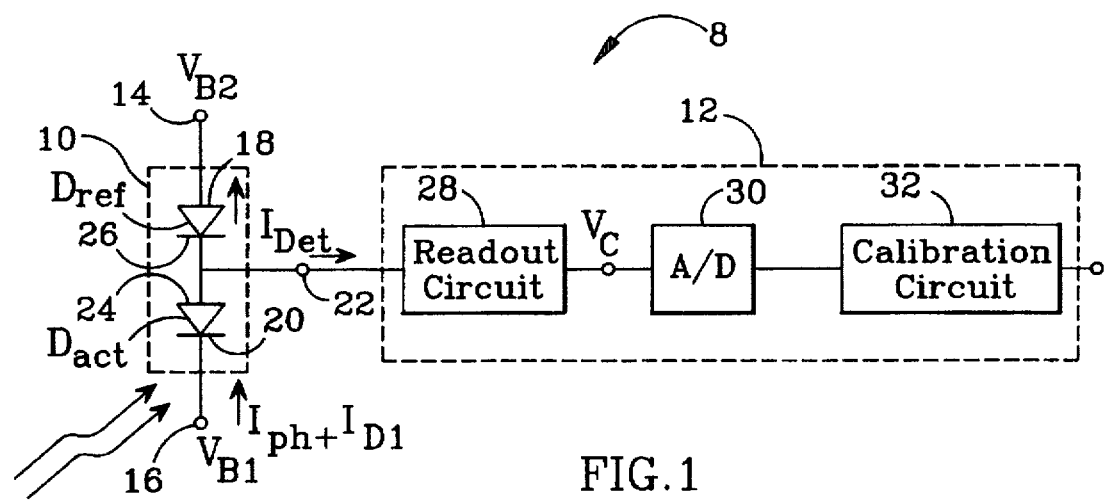
FIG. 1 is a schematic diagram of a photovoltaic detector and readout circuitry in accordance with the present invention.

FIG. 1 is a schematic diagram of a detector cell 8 including an integrated photovoltaic detector 10 and a digital signal processing (DSP) circuit 12. Photodetector arrays typically include between 64×64 and 1k×1k detector cells 8. The detector 10 includes a series connection of an active photovoltaic detector $D_{act}$ and a reference photovoltaic detector $D_{ref}$. A pair of bias terminals 14 and 16 are connected to the anode 18 and cathode 20 of $D_{ref}$ and $D_{act}$ respectively. Bias voltages $V_{B1}$ and $V_{B2}$ are applied to terminals 16 and 14, respectively, to reverse bias $D_{act}$ and $D_{ref}$. A readout terminal 22 is connected at the series connection of the active detector's anode 24 and the reference detector's cathode 26 to readout a detector current $I_{det}$. In this configuration, the reference detector generates a dark current $I_{Dref}$ in opposition to the dark current $I_{Dact}$ produced by the active detector. The detectors'polarities can be reversed, which in turn reverses the polarity of $I_{det}$.

The band gap energy of the active detector $D_{act}$ is selected so that the detector responds to incident photons over a desired range of wavelengths by generating a photocurrent $I_{ph}$. For example, infrared detectors having a band gap energy of 100 meV absorb photons up to wavelengths of approximately 12 microns and produces a photocurrent in the range of 1–100 nA depending on the area of the detector cell. The band gap energy of the reference detector $D_{ref}$ is preferably matched to the active detector's band gap energy so that their dark currents are the same and respond equally to changes in temperature. Furthermore, the active detector masks the reference detector from incident illumination so that the reference detector does not produce photocurrent. As a result, the detector current $I_{ph}$ read out at terminal 22 is ideally all photocurrent with no offset.

The DSP circuit 12 includes a readout circuit 28, an A/D converter 30, and a calibration circuit 32. The readout circuit 28 typically includes a capacitor that integrates the detection current for a preset integration period at which point the capacitor is discharged and reset. Eliminating the offset component of the detector current increases the integration period, which in turn increases he detector's SNR. The SNR of the integrated detector is approximately:

$$SNR_{integrated} = \sqrt{\frac{I_{Dact}}{2I_{ph}}} SNR_{active} \tag{1}$$

where $SNR_{active}$ is the SNR without the reference detector. Thus, if the dark current is more than approximately twice the photocurrent the SNR of the integrated detector is better than known detectors.

The A/D converter 30 digitizes the voltage signal $V_c$. Because the offset has been substantially removed from the detector current all of the A/D converter's bits, typically 14, are used to digitize the signal component. This greatly improves the resolution of the signal. Alternately, a lower resolution (8 to 10 bits), and thus cheaper, A/D converter can be used. The calibration circuit 32 computes the slope of the cell's response curve and normalizes it to a reference curve so that all of the cells 8 in the array have the same response. The dark current will vary by as much as a factor of two across the array. Therefore, it is important that each cell have its own calibration circuitry.

Figure 2:
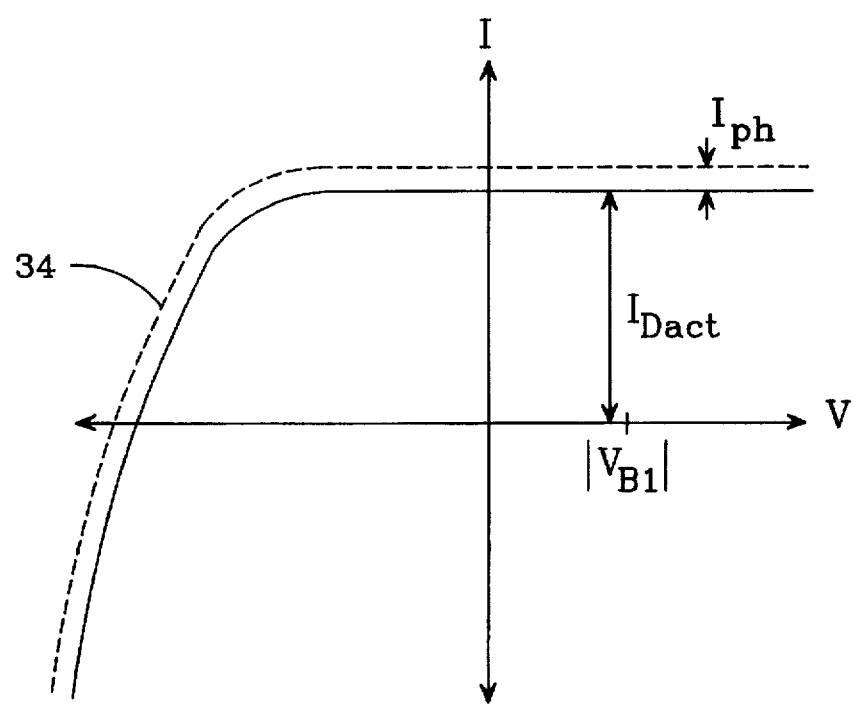
FIG. 2 is a plot of an I–V curve for the active photodetector shown in FIG. 1.

FIG. 2 is an I–V plot 34 for the active detector $D_{act}$. In the reverse bias mode, the detector operates on the right side of the plot. As shown, the dark current $I_{Dact}$ is approximately 5 to 10 times the photocurrent $I_{ph}$. The reference detector preferably has the same dark current characteristics but does not produce photocurrent.

Figure 3:
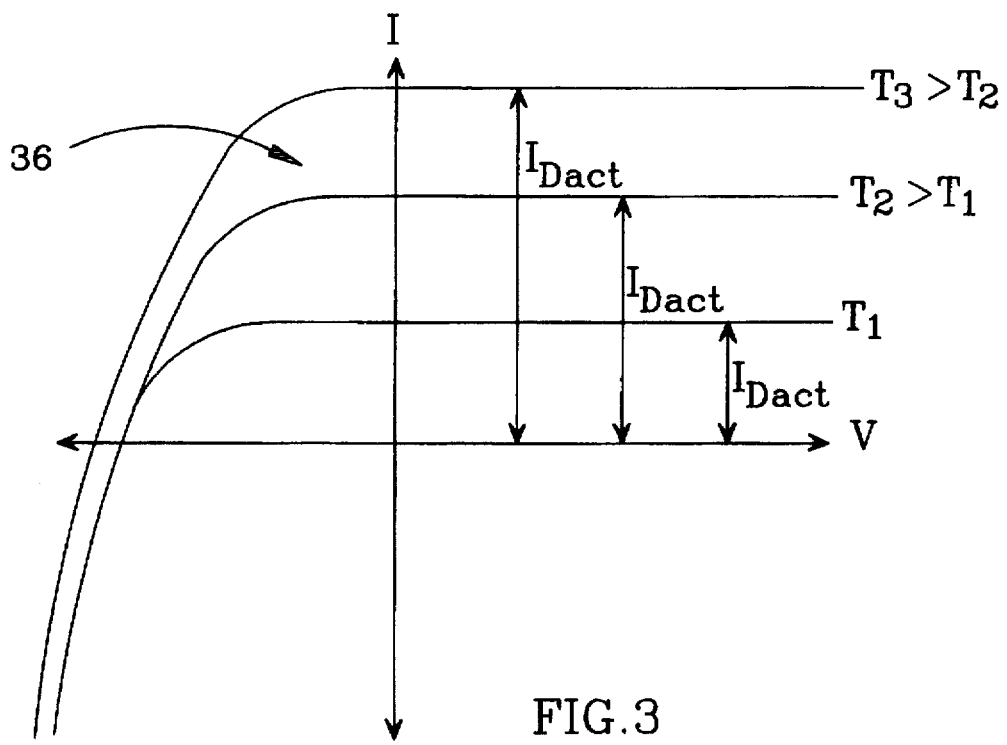
FIG. 3 is a plot of the I–V curve in FIG. 2 for different temperatures.

FIG. 3 is an I–V plot 36 for the active detector $D_{act}$ illustrating the sensitivity of the dark current $I_{Dact}$ to temperature changes. The dark current increases exponentially as the temperature increases with temperature changes as small as one-tenth of a degree producing noticeable changes in dark current. As a result, it is preferable that the active and reference detectors have the same band gap energy to match their temperature responses. Furthermore, the beneficial effect of providing the reference detector is greater in high temperature applications.

Figure 4:
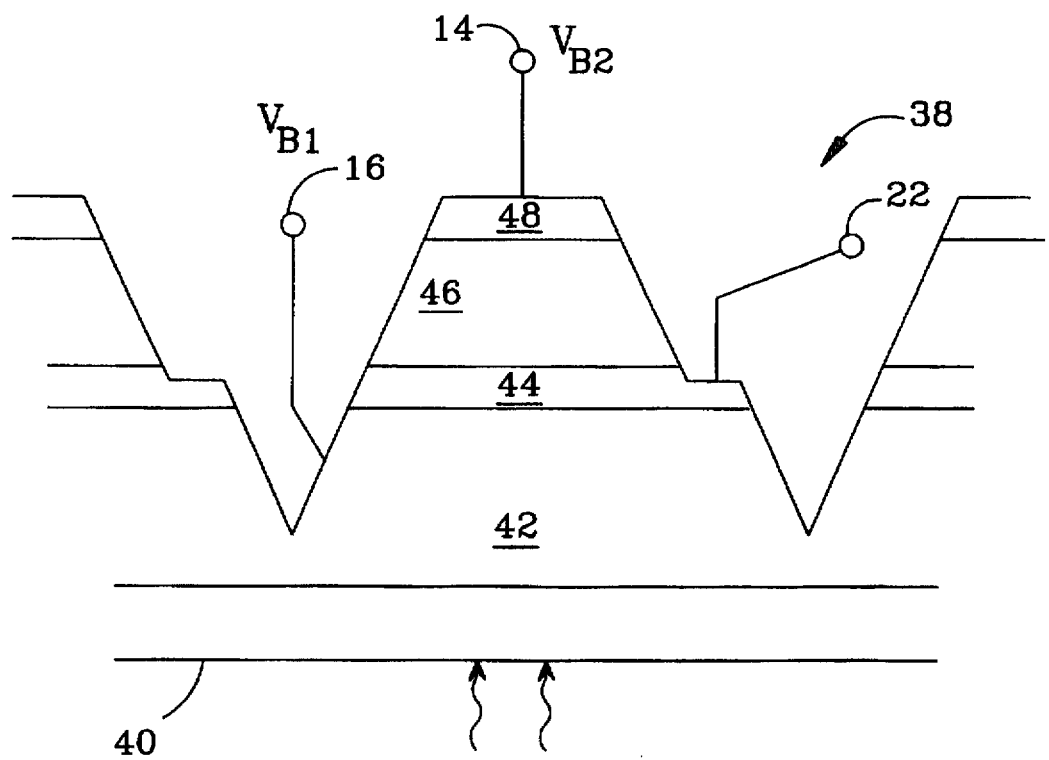
FIG. 4 is a sectional view of the photovoltaic detector in FIG. 1.

As shown in FIG. 4, the integrated photovoltaic detector 10 is preferably a four-layer heterojunction structure 38 on a transparent substrate 40. The substrate material is selected so that it has a lattice constant that matches the heterojunction structure 38 and has a band gap energy wide enough to pass the desired wavelengths. In an infrared detector a cadmium telluride (CdTe) or cadmium zinc telluride (CdZnTe) substrate having a thickness of 500–600 microns is typical.

The active detector includes a bulk N-type layer 42 on the substrate 40 and a thin P-type layer 44 on or in the surface of the bulk layer 42. The bias voltage terminal 16 and read out terminal 22 are connected to the N and P type layers, respectively. The layers are suitably indium (In) doped mercury cadmium telluride (HgCdTe). Alternately, the layers can be aluminum gallium arsenide (AlGaAs) or indium antimonide (InSb). The detector's band gap energy is set by adjusting the doping levels and the volume of material in each cell. The N-type layer is doped with approximately $10^{15}$–$10^{16}$ atoms/cm$^3$ of In and P-type layer is doped with approximately $10^{17}$–$10^{18}$ atoms/cm$^3$. Cell sizes range from 25×25 microns to 100×100 microns on a side with P and N layer thicknesses of approximately 2 and 15 microns, respectively. The P-type layer 44 preferably has a wider band gap than the N-type layer to inhibit dark current in the depletion layer. The two layers together must be thick enough to absorb all of the photons in the IR spectrum and thereby effectively mask the reference detector. Otherwise some photons will penetrate to the reference detector and generate a photocurrent in opposition to the active detector.

The reference detector includes a bulk N-type layer 46 on P-type layer 44 and a thin P-type layer 48 on or in the surface of the bulk layer 46. The bias voltage terminal 14 is connected to the P-type layer 48. The layers in the reference detector are preferably formed from the same material as the active layers. The layers' doping and volume are preferably controlled so that the band gap of N-type layer 46 is matched to that of N-type layer 42 and the band gap of P-type layer 48 is matched to that of P-type layer 44 so that the active and reference detectors' dark currents are matched over a temperature range.

The four-layer heterojunction structure is preferably fabricated using molecular beam epitaxy (MBE) to grow the layers 42 through 48 on the substrate 40. A reactive ion etch is preferably used to delineate the individual cells. Etching undercuts the upper layers so that the mesas between cells are angled. As a result, N-type layer 46 has to be thicker than N-type layer 42 to have the same volume. Alternately, the doping of layer 46 can be adjusted to vary the thermal carrier generation rate. This allows the leakage currents to be matched despite different volumes.

While several illustrative embodiments of the invention have been shown and described, numerous variations and alternate embodiments will occur to those skilled in the art. For example, the conductivity types shown in FIG. 4 can be reversed. Such variations and alternate embodiments are contemplated, and can be made without departing from the spirit and scope of the appended claims.

I claim:

1. An integrated semiconductor photovoltaic detector, comprising:

a substrate that is transparent to incident photons over a range of wavelengths;

a reverse biased active photovoltaic detector on said substrate, said active detector generating an active dark current and responding to photons incident on said substrate by generating a photocurrent;

a readout terminal for reading out a detector current, in which said photocurrent and active dark current form signal and offset portions of said detector current, respectively; and a reverse biased reference photovoltaic detector on and in series with said active detector, said reference detector generating a reference dark current in opposition to said active dark current to reduce the offset portion of said detector current.

2. The photovoltaic detector of claim 1, wherein said active and reference dark currents are approximately equal so that said detector current is substantially the same as said photocurrent.

3. The photovoltaic detector of claim 2, wherein said active and reference photovoltaic detectors have substantially equal band gap energies so that their respective dark currents are substantially matched over a temperature range.

4. The photovoltaic detector of claim 1, wherein said active photovoltaic detector has a band gap energy that is narrow enough that the active dark current is at least twice the photocurrent.

5. The photovoltaic detector of claim 4, wherein said active detector responds to incident photons having wavelengths in an infrared range.

6. The photovoltaic detector of claim 5, wherein said active and reference photovoltaic detectors have substantially equal band gap energies so that their respective dark currents are substantially matched over a temperature range so that said detector current is substantially the same as said photocurrent.

7. An integrated semiconductor photovoltaic detector, comprising:

a transparent substrate;

an active bulk layer on said substrate;

an active depletion layer on said active bulk layer, the interface of said active depletion and bulk layers forming an active p/n junction that absorbs substantially all incident photons over a range of wavelengths thereby producing a photocurrent and an active dark current;

a readout terminal on said active depletion layer for reading out a detector current, in which said photocurrent and active dark current form signal and offset portions of said detector current, respectively;

a reference bulk layer on said active depletion layer;

a reference depletion layer on said reference bulk layer, the interface of said reference depletion and bulk layers forming a reference p/n junction that absorbs photons over approximately said range such said reference p/n junction only produces a reference dark current;

a pair of bias terminals on said active bulk layer and said reference depletion layer, respectively, for reverse biasing said active and reference p/n junctions so that said reference dark current opposes said active dark current thereby reducing the offset portion of said detector current.

8. The photovoltaic detector of claim 7, wherein said active and reference bulk layers have substantially equal band gap energies so that their respective dark currents are substantially matched over a temperature range so that said detector current is substantially the same as said photocurrent.

9. The photovoltaic detector of claim 8, wherein said band gap energies are narrow enough that said dark currents are at least twice said photocurrent.

10. The photovoltaic detector of claim 9, wherein said range of wavelengths includes infrared wavelengths.

11. The photovoltaic detector of claim 8, wherein said active and reference depletion layers have substantially equal band gap energies which are wider than said bulk layers' band gap energies.

12. An integrated semiconductor photovoltaic detector, comprising:

a transparent substrate;

an active photovoltaic detector on said substrate comprising, a pair of active layers having opposite conductivity types, the interface of said layers forming an active junction; and an active terminal for reverse biasing said active layers to produce an active dark current at said active junction;

a reference photovoltaic detector on and connected in series with said active photovoltaic detector comprising, a pair of reference layers having opposite conductivity types, the interface of said layers forming a reference junction; and a reference terminal for reverse biasing said active layers to produce an reference dark current at said reference junction that opposes said active dark current, said active and reference photovoltaic detectors having substantially matched band gap energies so that their respective dark currents effectively cancel each other over a temperature range and said detectors absorb photons over a wavelength range, said pair of active layers being thick enough that substantially all photons in said wavelength range that are incident on said substrate are absorbed in the active junction so that only said active junction generates a photocurrent; and a readout terminal at the series connection of said active and reference photovoltaic detectors for reading out said photocurrent.

13. The photovoltaic detector of claim 12, wherein said band gap voltages are narrow enough that said dark currents are at least twice said photocurrent.

14. The photovoltaic detector of claim 13, wherein said wavelength range includes infrared wavelengths.

* * * * *